United States Patent Office 3,445,784
Patented May 20, 1969

3,445,784
ULTRA-HIGH FREQUENCY CONTROL AND POWER SUPPLY SYSTEMS
James E. Staats and Robert D. Ogburn, Louisville, Ky., assignors to General Electric Company, a corporation of New York
Continuation-in-part of application Ser. No. 569,006, July 27, 1966. This application Oct. 19, 1967, Ser. No. 676,584
Int. Cl. H03b 9/10
U.S. Cl. 331—86
28 Claims

ABSTRACT OF THE DISCLOSURE

There is disclosed an ultra-high frequency control and power supply system for a crossed-field discharge device, such as a magnetron, having a pair of input terminals and a pair of output terminals and characterized by the production of an ultra-high frequency A.C. voltage across the output terminals in response to the application of a D.C. voltage across the input terminals; the system includes a voltage doubler and rectifier circuit and an impedance, preferably a thermistor, having a start condition and a run condition and being automatically converted from its start condition into its run condition in response to the conduction of a predetermined amount of energy through the device, a preferred circuit also incorporating a mangetic switch responsive to the current flowing through the device for selectively adding and withdrawing another impedance in the circuit; and there is also disclosed a bypass capacitor across the terminals of the device for aiding the starting thereof.

---

This application is a continuation-in-part of the copending application of James E. Staats, Ser. No. 569,006, filed July 27, 1966, and now abandoned.

The present invention relates to control and power supply systems for use in ultra-high frequency generating devices incorporated in electronic cooking ovens, and it is a general object of the invention to provide an improved such system for use with the magnetron disclosed in U.S. Letters Patent No. 3,315,121, granted Apr. 18, 1967, to James E. Staats for Crossed-Field Electric Discharge Device and the crossed-field discharge device disclosed in the copending application of James E. Staats, Ser. No. 559,267, filed June 21, 1966.

In the Staats application Ser. No. 559,267, there is disclosed a power supply system, including a voltage doubler and rectifier circuit of the fundamental connection and arrangement disclosed in the copending application of James E. Staats, Ser. No. 181,144, filed Mar. 20, 1962, and incorporating a low-voltage magnetron of the construction and arrangement disclosed in the Staats Patent No. 3,315,121.

While the Staats circuit network of application Ser. No. 181,144 is highly advantageous for running the Staats low-voltage crossed-field discharge device and the Staats low-voltage magnetron (hereinafter collectively referred to as the Staats low-voltage devices), the same is not ideally suited for starting the Staats low-voltage devices, since the voltage doubler and rectifier circuit has an inherently low impedance. While a low impedance supply circuit is highly advantageous for running these Staats low-voltage devices, it is not altogether suitable for starting oscillation in these Staats low-voltage devices. It also is highly undesirable to apply the full run voltage acros the low-voltage devices until the cathode is heated, yet it is also undesirable to have a separate cathode heating portion of the start sequence. In addition, when switching from low-voltage to high-voltage operation, the Staats low-voltage devices, and specifically the envelope thereof, acts as a single turn transformer which produces a magnetic field that opposes the magnetic field in series with the devices, and may in certain instances stop operation of the device as an oscillator during the switching from low-voltage operation to high-voltage operation.

Accordingly, it is an object of the present invention to provide an ultra-high frequency control and power supply system of the type set forth which includes control means having a start condition for applying a relatively low D.C. start voltage across the device and having a run condition for applying a relatively high D.C. run voltage across the device, the control means being automatically converted from its start condition into its run condition in response to the conduction of a predetermined amount of energy through the device, whereby to insure that the cathode has been sufficiently heated before the high D.C. run voltage is applied to the device.

In connection with the foregoing, it is another object of the invention to provide a control and power supply system of the type set forth wherein the control means essentially comprises a resistive element having a relatively high negative temperature coefficient of resistance, the resistive element preferably being a thermistor of the self-heating type.

Another object of the invention is to provide an ultra-high frequency control and power supply system of the type set forth wherein the control means is in the connections between a block connected to a source of power supply of relatively low-voltage A.C. and a rectifier unit having the output thereof coupled to the crossed-field discharge device, the control means having a start condition for governing the rectifier unit to produce a relatively low D.C. start voltage across the output terminals thereof and having a run condition for governing the rectifier unit to produce a relatively high D.C. run voltage across the output terminals thereof, the control means being automatically converted from its start condition into its run condition in response to the conduction of a predetermined amount of energy through the crossed-field discharge device.

In connection with the foregoing object, it is another object of the invention to provide a control and power supply system of the type set forth, wherein the control means essentially comprises an impedance that is substantially continuously variable between a relatively high start value and a relatively low run value, thereby to provide a continuously rising voltage across the output terminals of the rectifier unit in the conversion of the control means between its start condition and its run condition.

Another object of the invention is to provide a control and power supply system of the type set forth including first control means having a start position imparting relatively high impedance to the input of the rectifier unit and a run position imparting relatively low impedance to the input of the rectifier unit and second control means responsive to the conduction of a predetermined current through the device for selectively operating the first control means between its start position and its run position.

Still another object of the invention is to provide an improved control and power supply system of the type set forth including first control means having a start position for applying a relatively low D.C. start voltage across the crossed-field discharge device and having a run position for applying a relatively high D.C. run voltage across the device, and second means responsive to a predetermined strength of the magnetic field about the field winding for the device for selectively operating the first control means between its start position and its run position.

Another object of the invention is to provide an improved control and power supply system of the type set forth including first control means having a start condition for applying a relatively low D.C. start voltage across the associated crossed-field discharge device and having a run condition for applying a relatively high D.C. run voltage across the device, the first control means being automatically converted from its start condition into its run condition in response to the conduction of a predetermined amount of energy through the device, second control means having a start position imparting relatively high impedance to the input of the rectifier unit for the device and a run position imparting realtively low impedance to the input of the unit, and third control means responsive to the conduction of a predetermined current thruogh the device for selectively operating the second control means between its start position and its run position.

Another object of the invention is to provide an improved ultra-high frequency control and power supply system comprising a crossed-field discharge device including a pair of input terminals and a pair of output terminals, the device being characterized by the production of an A.C. voltage of ultra-high frequency across the output terminals thereof in response to the application of a D.C. voltage across the input terminals thereof, means for applying a D.C. voltage across the input terminals of said device, and a capacitive element coupled between the input terminals of the device to bypass surges of energy therearound.

A further object of the invention is to provide an ultra-high frequency control and power supply system of the type set forth wherein the crossed-field discharge device has a field winding in series therewith and a capacitive element coupled between the input terminals thereof to bypass surges of current around the device and through the field winding when the applied D.C. voltage to the device is changed from a relatively low start voltage to a relatively high run voltage.

Further features of the invention pertain to the particular arrangement of the parts of the control and power supply system, whereby the above-outlined and additional operating features thereof are attained.

The invention, both as to its organization and method of operation, together with further objects and advantages thereof, will best be understood by reference to the following specification taken in connection with the accompanying drawings, in which:

FIGURES 1 and 2 taken together, and respectively arranged left and right in end-to-end realtion, comprise a diagrammatic illustration of a first control and power supply system for a crossed-field discharge device incorporated in an electronic oven and embodying the present invention;

Figure 1:
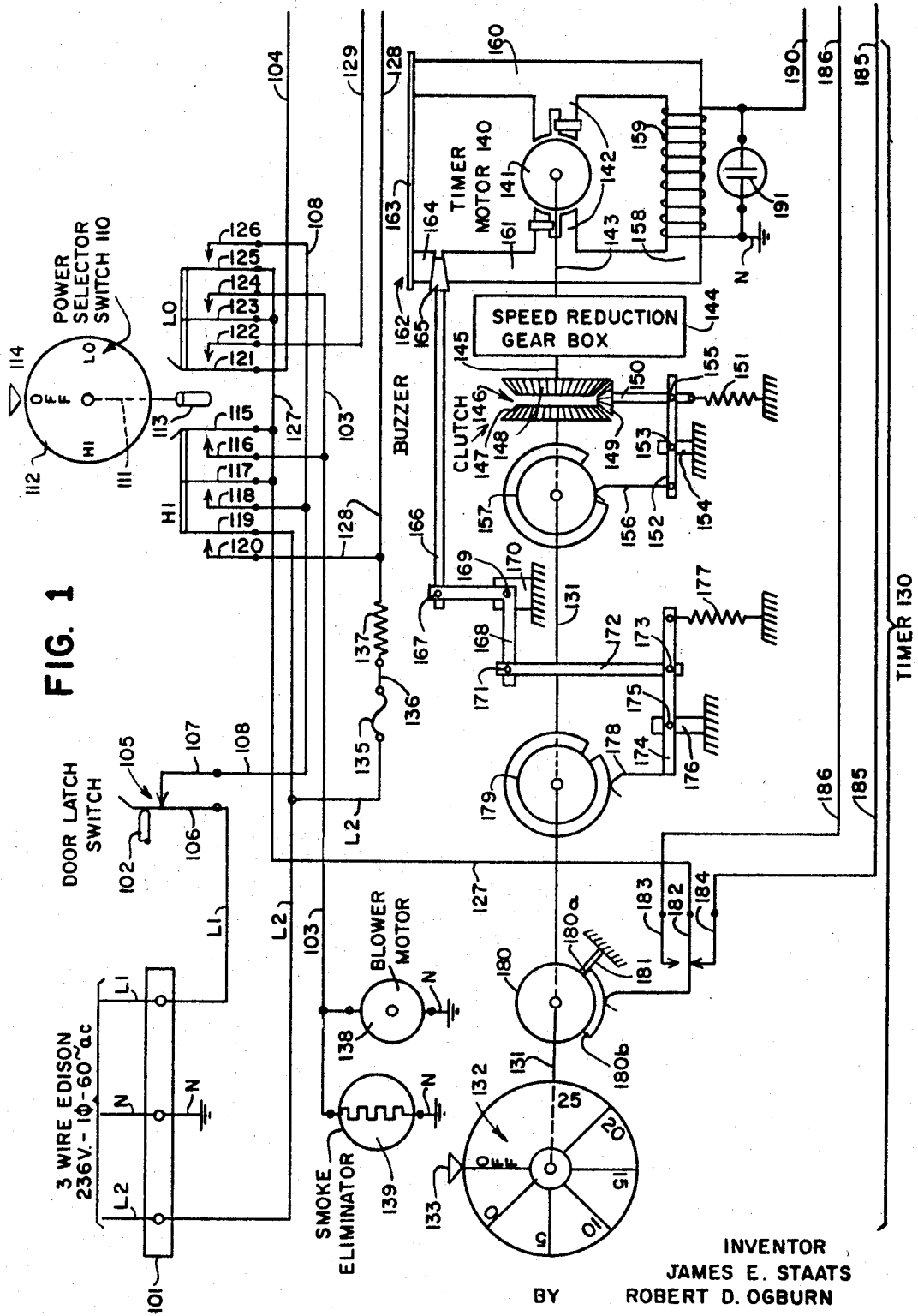
Figure 3:
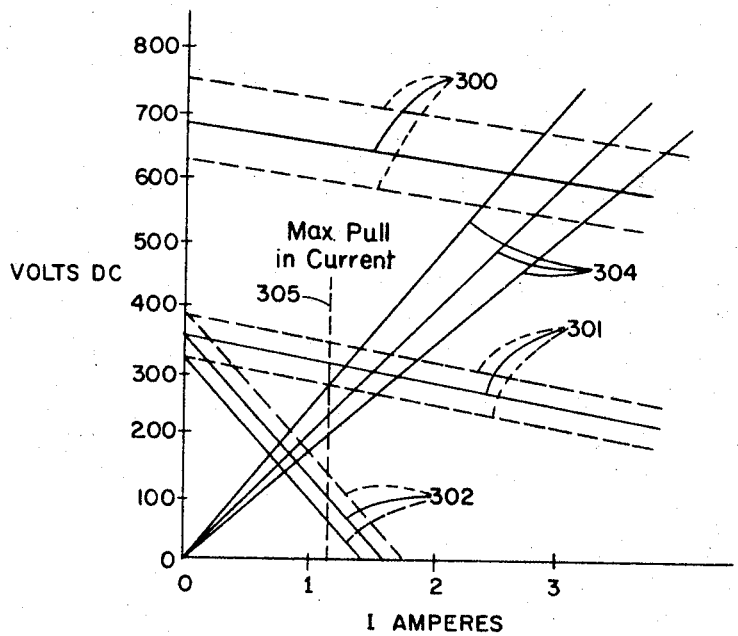
FIG. 3 is a graph illustrating certain characteristics of the control and power supply system of the present invention.
Figure 5:
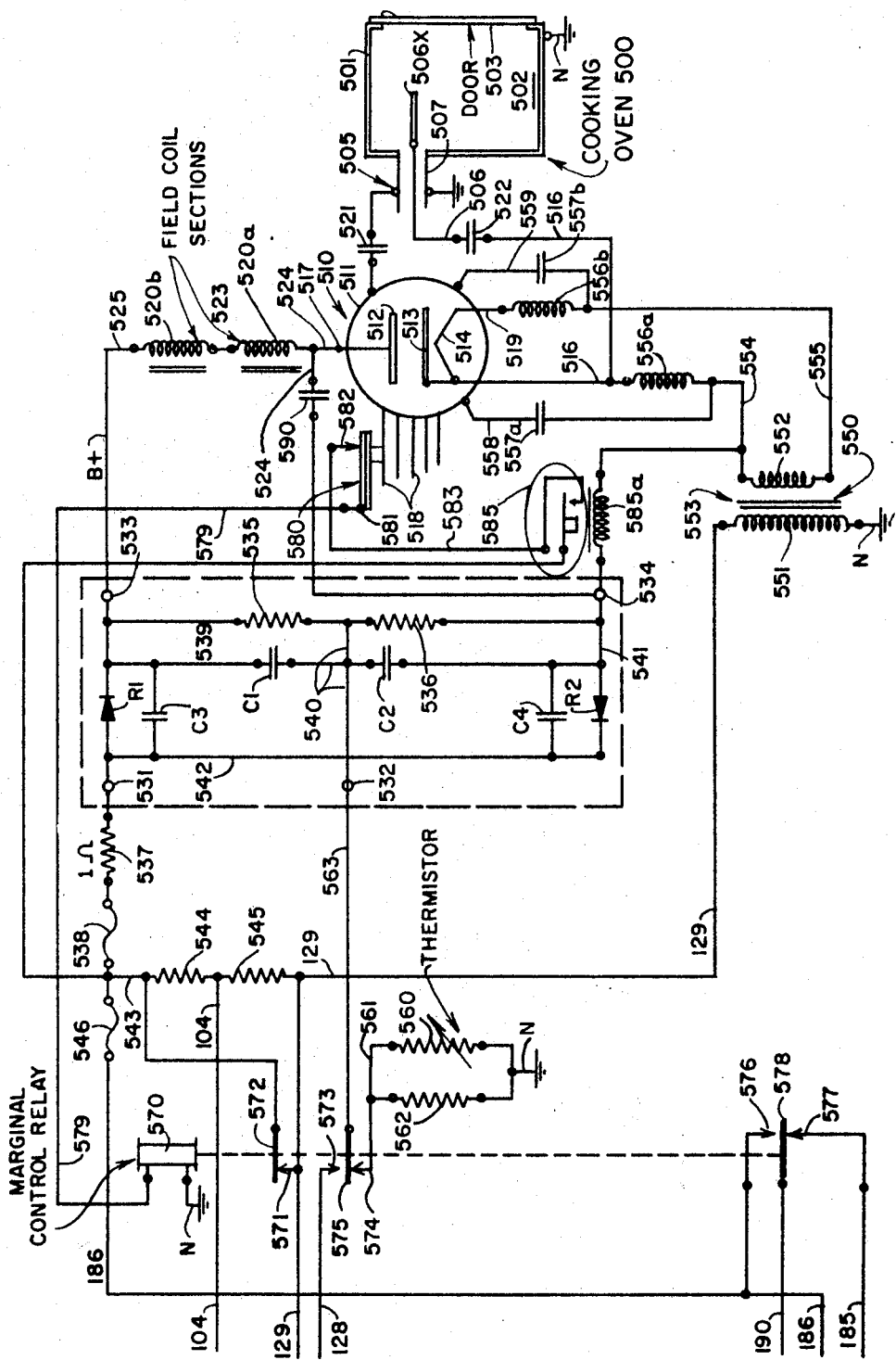
Figure 6:
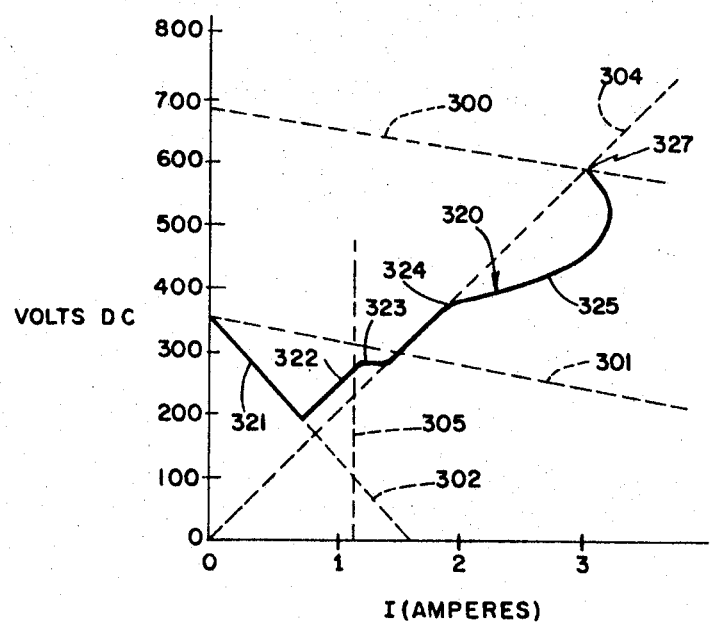
Figure 7:
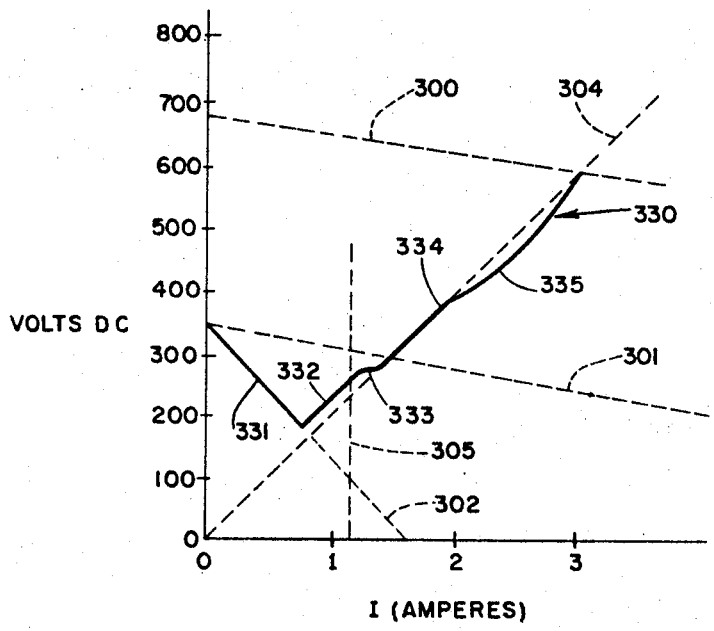

FIG. 5 and FIG 1, taken together, and respectively arranged right and left in end-to-end relation, comprise a diagrammatic illustration of a second control and power supply system for a crossed-field discharge device incorporated in an electronic oven and embodying the present invention; and FIGS. 6 and 7 are graphs similar to the graph of FIG. 3 and illustrating a typical starting characteristics for two forms of the control and power supply system of the present invention.

Figure 2:
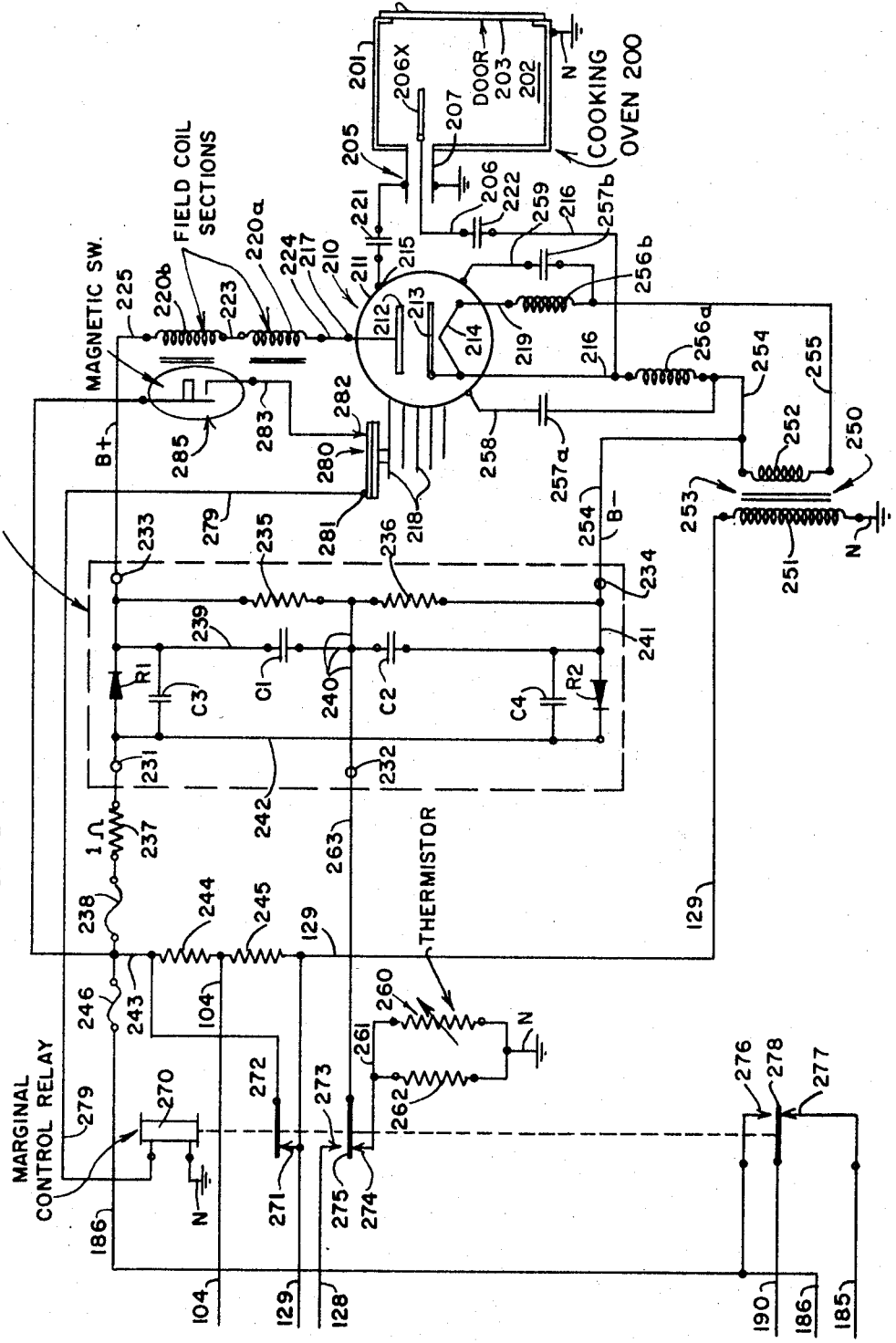

Referring to FIGS. 1 and 2, the control and power supply system there illustrated, and embodying the features of the present invention, is of the fundamental connection and arrangement of that disclosed in the previously mentioned Staats application, Ser. No. 181.144; and the network essentially comprises a crossed-field discharge device 210 of the construction and arrangement of that disclosed in the previously mentioned Staats application Ser. No. 559,267. Specifically, the device 210 comprises a substantially cylindrical metal envelope 211, structure 212 enclosed in the envelope 211 and constituting an anode, structure 213 enclosed in the envelope 211 and constituting a cathode, a heater 214 enclosed in the envelope 211 and operatively associated with the cathode 213, an output terminal 215 connected to the envelope 211, an ouptut terminal 216 directly connected to the cathode 213, an input terminal 217 directly connected to the anode 212 and extending out of the envelope 211 and an input terminal in the form of the terminal 216 directly connected to the cathode 213 extending out of the envelope 211, the terminal 216 being both an input terminal and an output terminal for the device 210.

The device 210 is opeartive to supply ultra-high frequency of about 915 mc., with a power output at the output terminals 215 and 216 in the general range 50 to 800 watts. The device 210 is arranged to supply the R.F. power to a cooking oven 200 that comprises a substantially box-like metal shell or liner 201 defining a cooking cavity 202 and having a front opening provided with a cooperating front door 203, the front door 203 being selectively operative between open and closed positions with respect to the cooperating front opening in a conventional manner. More particularly, a transmission line 205 extends from the device 210 to the cooking oven 200, the transmission line 205 being of the coaxial type including an inner conductor 206 and an enclosing outer conductor 207 electrically insulated therefrom. Both of the output terminals 215 and 216 of the device 210 are at a substantial voltage D.C. with respect to ground potential, so that the output terminals 215 and 216 are electrically insulated from ground potential, as well as from each other. The output terminal 215 is coupled by a capacitor 221 to the adjacent end of the outer conductor 205; the output termial 216 is coupled by a capacitor 222 to the adjacent end of the inner conductor 206; the remote end of the inner conductor 206 projects as an antenna 206x into the oven cavity 202; the remote end of the outer conductor 207 is electrically connected to the metal liner 201; and the outer conductor 207 and the metal liner 201 are electrically connected to ground potential or "grounded out," as indicated. Thus the R.F. power produced by operation of the deivce 210 is radiated from the antenna 206x into cooking cavity 202, so as to produce cooking effects upon food arranged therein, all in a conventional manner. In the device 210, one terminal of the heater 214 is electrically connected to the input terminal 216, and the other terminal of the heater 214 is electrically connected to a heater terminal 219 that projects out of the envelope 211. Further the device 210 comprises a composite field winding including two sections 220a and 220b connected in series relation by a conductor 223. The input terminal 217 that is connected to the anode 212 of the device 210 is connected by a conductor 224 to the free terminal of the field winding section 220a, and the free terminal of the field winding section 220b is connected to a conductor 225.

Also, the control and power supply system comprises an insulating terminal block 101 terminating a source of power supply of the 3-wire Edison type and including a neutral line N that is electrically connected to ground potential, and a pair of side lines L1 and L2 that are electrically insulated from each other and from the neutral line N. Operatively associated with the front door 203 of the cooking oven 200 is latching mechanism indicated at 102, which latching mechanism 102 is selectively operative into latch and unlatch positions with respect to the liner 201, when the front door 203 is moved between its closed and open positions with respect to the cooperating front opening. Associated with the latching mechanism 102 is a door latch switch 105 that includes a pair of switch springs 106 and 107. In the arrangement, the door latch switch 105 is selectively operated between closed and open positions in response to the operation of the latching mechanism 102 into its respective latch and unlatch positions. Specifically, operation of the latching mechanism 102 into its latch position operates the door latch switch 105 into its closed position, moving the switch spring 106 to engage the switch spring 107. In the arrangement, the switch spring 106 terminates the line conductor L1, and the switch spring 107 terminates a conductor 108.

A power selector switch 110 is incorporated in the control and power supply system; which selector switch 110 comprises a rotatable operating shaft 111, a manual dial 112 operatively connected to the outer end of the shaft 111 and an insulator 113 operatively connected to the inner end of the shaft 111. The power selector switch 110 has off, high and low positions; whereby the dial 112 carries corresponding legends "OFF," "HI" and "LO"; and which legends cooperate with an associated stationary marker 114. Also, the power selector switch 110 comprises a set of high power switch springs 115, 116, 117, 118, 119 and 120, and a set of low power switch springs 121, 122, 123, 124, 125 and 126; which sets of switch springs are selectively operated by the cooperating insulator 113. Specifically: when the dial 112 occupies its "OFF" position, the pairs of switch springs 115, 116 and 117, 118 and 119, 120 are disengaged, and the pairs of switch springs 121, 122 and 123, 124 and 125, 126 are disengaged. When the dial 112 is rotated into its "HI" position, the insulator 113 actuates the switch springs 115 and 117 and 119 to engage the switch springs 116 and 118 and 120, respectively. When the dial 112 is rotated into its "LO" position, the insulator 113 actuates the switch springs 121 and 123 and 125 to engage the switch springs 122 and 124 and 126, respectively. In the arrangement, the switch springs 115 and 117 and 123 and 125 commonly terminate a conductor 127, the switch springs 116 and 124 commonly terminate a conductor 103, the switch springs 118 and 126 commonly terminate the conductor 108, the switch spring 119 terminates the line conductor L2, the switch spring 120 terminates a conductor 128, the switch spring 121 terminates a conductor 104 and the switch spring 122 terminates a conductor 129.

Further, the circuit network comprises a timer 130 which includes a rotatably mounted operating shaft 131 carrying a manually operable dial 132 on the outer end thereof; which dial 132 carries the indices "OFF" and the numerical indices "0," "5," "10," etc., and "25"; which indices cooperate with a stationary index marker 133. Also, the timer 130 comprises a timer motor 140 of the synchronous or clock type, including a rotor 141 and a cooperating pair of pole pieces 142, the rotor 141 being rigidly secured to a rotatably mounted operating shaft 143. The operating shaft 143 is operatively connected to a speed reduction gear box indicated at 144; which gear box 114 is provided with an output shaft 145. The operating shaft 131 and the output shaft 145 are arranged in longitudinal axial alignment with each other and are selectively interconnected by clutch mechanism 146 including two longitudinally spaced-apart gears 147 and 148 rigidly connected to the adjacent ends of the shafts 131 and 145, respectively, as well as a pinion 149 carried by a vertically movable stub shaft 150; which pinion 149 is adapted to engage the two gears 147 and 148 when the clutch mechanism 146 occupies its clutch position; and which pinion 149 is adapted to disengage the two gears 147 and 148 when the clutch mechanism 146 occupies its declutch position. The stub shaft 150 is biased by a cooperating coil spring 151 into a declutch position, so as to move the pinion 149 vertically into its declutch position disengaging the gears 147 and 148. The stub shaft 150 is moved vertically against the bias of the coil spring 151 into a clutch position, so as to move the pinion 149 vertically into its clutch position engaging the gears 147 and 148, by a cooperating lever 152; which lever 152 is pivotally mounted at the intermediate portion thereof, as indicated at 153, upon a stationary support 154; and which lever 152 is pivotally connected at one end thereof as indicated at 155 to the stub shaft 150. The other end of a the lever 152 carries a follower 156 which rides a cooperating cam 157 rigidly secured to the operating shaft 131.

The timer motor 140 further comprises magnetic yoke structure including an arm 158 carrying a winding 159. The opposite ends of the arm 158 are respectively connected to two legs 160 and 161 that respectively carry the two pole pieces 142 that are operatively associated with the rotor 141. The leg 160 projects beyond the adjacent pole piece 142 and carries at the outer end thereof a buzzer 162 that includes a metal spring 163 formed of magnetic material, one end of the spring 163 being rigidly secured to the adjacent end of the leg 160, and the free end of the spring 163 carrying an armature 164 disposed in cooperating spaced-apart relation with the adjacent end of the leg 161. Also, the buzzer 162 includes a wedge 165 formed of magnetic material and arranged in cooperating relation between the armature 164 and the adjacent end of the leg 161; which wedge 165 is carried upon the outer end of a rod 166 mounted for longitudinal movements substantially parallel to the operating shaft 143. The inner end of the rod 166 is pivotally connected as indicated at 167, to one arm of a bell crank 168 that is pivotally supported, as indicated at 169, upon an external support 170. Another arm of the bell crank 168 is pivotally connected as indicated at 171, to one end of a rod 172; and the other end of the rod 172 is pivotally connected, as indicated at 173, to the intermediate portion of a lever 174. Another intermediate portion of a lever 174 is pivotally connected, as indicated at 175, to an external support 176. One end of the lever 174 is biased into a given position by a cooperating coil spring 177; and the other end of the lever 174 carries a follower 178 that rides a cooperating cam 179 rigidly secured to the operating shaft 131.

Also, the operating shaft 131 carries an insulating cam 180 rigidly affixed thereto; which cam 180 cooperates with an external stop 181. Moreover, the cam 180 cooperates with a follower switch spring 182 riding the same; which switch spring 182 cooperates with two other switch springs 183 and 184. In the arrangement, the switch springs 182, 183 and 184, respectively, terminate the conductor 127, a conductor 186 and a conductor 185.

When the dial 132 occupies its "OFF" position: one shoulder 180a of the cam 180 engages the limit stop 181; the cam 180 actuates the switch spring 182 to disengage the switch spring 183 and to engage the switch spring 184; the cam 179 actuates the follower 178, so as to rotate the lever 174 in the counter-clockwise direction about the pivot 175, as shown in FIG. 1, so that the rod 172 actuates the bell crank 168 in order to actuate the rod 166 for the purpose of projecting the wedge 165 into a keeping position and between the armature 164 and the adjacent end of the leg 161; and the cam 157 actuates the follower 156, so as to release the lever 152 in order to allow the coil spring 151 to rotate the lever 152 in a clockwise direction about the pivot 153, as shown in FIG. 1, so that the stub shaft 150 moves downwardly to move the pinion 149 into its declutch position to disengage the two gears 147 and 148 for the purpose of declutching the shaft 145 from the operating shaft 131.

When the dial 132 occupies its "0" position; the one shoulder 180a of the cam 180 disengages the limit stop 181; the cam 180 actuates the switch spring 182 to disengage the switch spring 183 and to engage the switch spring 184; the cam 179 actuates the follower 178, so as to release the lever 174 in order to allow the coil spring 177 to rotate the lever 174 in the clockwise direction about the pivot 175, as shown in FIG. 1, so that the rod 172 actuates the bell crank 168 in order to actuate the rod 166 for the purpose of withdrawing the wedge 185 into a releasing position and from between the armature 164 and the adjacent end of the leg 161; and the cam 157 actuates the follower 156, so as to release the lever 152 in order to allow the coil spring 151 to rotate the lever 152 in the clockwise direction about the pivot 153, as shown in FIG. 1, so that the stub shaft 150 moves downwardly to move the pinion 149 into its declutch position disengaging the two gears 147 and 148 for the purpose of declutching the shaft 145 from the operating shaft 131.

When the dial 132 occupies any of its numerical positions "1," "5," "10," etc.; the one shoulder 180a of the cam 180 disengages the limit stop 181; the cam 180 actuates the switch spring 182 to engage the switch spring 183 and to disengage the switch spring 184; the cam 179 actuates the follower 178, so as to rotate the lever 174 in the counter-clockwise direction about the pivot 175, as shown in FIG. 1, so that the rod 172 actuates the bell crank 168 in order to actuate the rod 166 for the purpose of projecting the wedge 165 into its keeping position and between the armature 164 and the adjacent end of the leg 161; and the cam 157 actuates the follower 156, so as to rotate the lever 152 in the counter-clockwise direction about the pivot 153, as shown in FIG. 1, so that the stub shaft 150 moves upwardly to move the pinion 149 into its clutch position engaging the two gears 147 and 148 for the purpose of clutching the shaft 145 to the operating shaft 131.

The winding 159 of the timer motor 140 is connected across the neutral line N and a conductor 190; and a pilot lamp 191 of the neon type is bridged across the winding 159 and between the neutral conductor N and the conductor 190. When the conductor 190 is connected to the line L1, via a circuit traced hereinafter, the winding 159 is energized in an obvious manner, and the pilot lamp 191 glows to indicate the energization of the winding 159. Energization of the winding 159 causes rotation of the rotor 141 in a known manner; and it may be assumed that the same is rotated at a synchronous speed of 3600 r.p.m. Also, it may be assumed that the gear box 144 causes rotation of the shaft 145 at a speed of 1 revolution per 40 minutes, as indicated by the constructional example of the dial 132, so that the dial 132 is rotated ½ revolution per 20 minutes in accordance with the legends "0," and "20" carried thereby. Specifically, rotation of the shaft 143 at 3600 r.p.m. causes gear box 144 to drive the shaft 145 at a speed of 1 revolution per 40 minutes; which rotation of the shaft 145 is transmitted to the operating shaft 131 only when the clutch 146 is operated into its clutch position causing rotation of the operating shaft 131 in the counterclockwise direction, as viewed in FIG. 1, and at the speed of 1 revolution per 40 minutes; and which rotation of the shaft 145 is not transmitted to the operating shaft 131 when the clutch 146 is operated into its declutch position. Also, energization of the winding 159 causes magnetic "leakage" of flux via the path between the legs 160 and 161 including the spring 163, the armature 164 and the wedge 165. When the wedge 165 occupies its projected position between the armature 164 and the adjacent end of the leg 161, the armature 164 is restrained against chatter, so that no substantial audible noise produced and the buzzer 162 may be considered to be "turned off." On the other hand, when the wedge 165 occupies its withdrawn position from between the armature 164 and the adjacent end of the leg 161, the armature 164 is released to chatter, so that the same vibrates into alternate engagement and disengagement with the wedge 165, in order to produce an audible noise and the buzzer 162 may be considered to be "turned on."

In the timer 130, rotation of the dial 132 into its "25" minute position causes the other shoulder 180b to engage the limit stop 181, so as to prevent clockwise rotation thereof beyond its "25" minute position mentioned. In passing, it is noted that any suitable angle less than 360° of rotation may be provided between the two shoulders 180a and 180b; and this angle may correspond to any desired maximum setable time interval depending upon the gear box 144. Thus, the "25" minute position of maximum setable time interval is of no significance and is only illustrated by way of an example.

Recapitulating, with reference to the operation of the timer 130: the same is manually rotated by the cook out of its "OFF" position in the clockwise direction, and through its "0" position, into some desired numerical position, such, for example, as the "20" minute position, so as to present a corresponding cooking time interval of 20 minutes. As explained more fully hereinafter, this setting of the dial 132 into its "20" minute position causes the start sequence of the electronic auxiliaries; subsequently, and upon initiation of operation of the preset cooking cycle in the oven cavity 202, operation of the timer 140 is initiated, with the result that the shaft 145 is rotated to effect roation of the operating shaft 131 through the clutch 146 in its clutch position and in the counter-clockwise direction at the speed of 1 revolution per 40 minutes (½ revolution per 20 minutes). Thus, at the expiration of 20 minutes of cooking time interval, the dial 132 is rotated into its "0" position; whereby the cam 180 operates the switch springs 182 to 184 to bring about termination of the cooking cycle in the oven cavity 202. Also, the cam 157 causes operation of the clutch 146 into its declutch position, so that further operation of the timer motor 140 does not disturb the "0" position of the dial 132. Further, the cam 179 causes operation of the wedge 165, so that the buzzer 162 is operated from its "turn-off" position into its "turn-on" position to produce an audible noise indicating to the cook the termination of the preset cooking time interval.

The cook receiving the audible signal noted, then manually rotates the dial 132 in the counter-clockwise direction from its "0" position back into its "OFF" position; whereby the timer 179 causes operation of the timer 179 causes operation of the wedge 165, so that the buzzer 162 is operated from its "turn-on" position back into its "turn-off" position to arrest the audible noise produced thereby.

Further considering the circuit network, the crossed-field discharge device 210 is supplied with D.C. power from an associated voltage doubler and rectifier circuit or unit 230 that comprises a pair of input terminals 231, 232 and a pair of output terminals 233, 234, as well as a pair of capacitors C1 and C2, that are preferably of the electrolytic type, and a pair of rectifying diodes R1 and R2, that are preferable of the silicon-crystal type. Also, the circuit 230 comprises a pair of bleeder or stabilizing resistors 235 and 236 connected in series with each other and across the output terminals 233, 234, and a surge limiting resistor 237 and a current protective device in the form of a thermal fuse 238. One terminal of the capacitor C1 is connected by a conductor 239 to the output terminal 233; the other terminal of the capacitor C1 is connected by a conductor 240 to one terminal of the capacitor C2; and the other terminal of the capacitor C2 is connected by a conductor 241 to the output terminal 234. The input terminal 231 is connected by a conductor 242 to the positive pole of the diode or rectifier R1 and to the negative pole of the diode or rectifier R2; the negative pole of the rectifier R1 is connected to the conductor 239; and the postive pole of the rectifier R2 is connected to the conductor 241. The input terminal 231 is connected to one terminal of the surge resistor 237 and the other terminal of the surge resistor 237 is connected to one terminal of the fuse 238. The other terminal of the fuse 238 is connected to a conductor 243; a current protective device in the form of a thermal fuse 246 interconnects the conductors 186 and 243. The output terminal 233 is connected to a B+ conductor; the output terminal 234 is connected to a B− conductor. There also is provided in parallel with the rectifier R2 a capacitor C4, the capacitors C3 and C4 bypassing RF interference around the rectifiers R1 and R2, respectively.

The circuit network further comprises a transformer 250 provided with a primary winding 251 and a secondary winding 252, as well as a coupling magnetic core 253. One terminal of the primary winding 251 is connected to a conductor 129 that also is connected to one terminal of a resistor 245; the other terminal of the resistor 245 is connected by the conductor 104 to one terminal of a resistor 244; and the other terminal of the resistor 244 is connected to the conductor 243 to which is supplied the potential on the main conductor L1 when the circuit network is in its start position. The other terminal of the primary winding 251 is connected by the conductor N to ground potential. One terminal of the secondary winding 252 is connected to the B− potential on a conductor 254 and the other terminal of the secondary winding 252 is connected to a conductor 255. The B− conductor 254 is connected to the conductor 216 via a reactive impedance 256a and the conductor 255 is connected to the conductor 219 via a reactive impedance 256b. The conductor 254 is also connected to the envelope 211 of the device 210 via a capacitive impedance 257a and a conductor 258, and the conductor 255 is likewise connected to the envelope 211 of the device 210 via a capactive impedance 257b and a conductor 259. By this connection, the B− potential is applied to the cathode 213 of the device 210 while the impedance 256a, 256b, 257a and 257b prevent the introduction of RF energy into the transformer 250.

Further, the circuit network comprises a thermistor 260, the thermistor 260 being a resistive element characterized by a high negative temperature coefficient of resistance, the thermistor 260 more specifically being of the self-heating type. One terminal of the thermistor 260 is connected to ground potential by the neutral conductor N and the other terminal is connected to a conductor 261. Disposed in parallel with the thermistor 260 is a resistor 262 having one terminal grounded by the neutral conductor N and having the other terminal connected to the conductor 261.

In the start condition of the voltage doubler and rectifier circuit 230, it is desired to connect the thermistor 260 and the resistor 262 to the input terminal 232 to which is connected a conductor 263, and to this end a marginal control relay 270 has been provided. One terminal of the control relay 270 is connected by the neutral conductor N to ground potential and the other terminal thereof is connected to a conductor 279. There is associated with the relay 270 a first pair of switch springs 271, 272 and a second set of switch springs 273, 274, 275 and a third set of switch springs 276, 277 and 278. The switch spring 271 terminates the conductor 129; the switch spring 272 terminates the conductor 243; the switch spring 273 terminates a conductor 128; the switch spring 274 terminates the conductor 261; the switch spring 275 terminates a conductor 263; the switch spring 276 terminates the conductor 186; the switch spring 277 terminates the conductor 185; and the switch spring 278 terminates the conductor 190. When the relay 270 is in the de-energized position illustrated in FIG. 2, the switch springs 271, 272 are closed, thus to interconnect the conductors 129 and 243 and as a consequence shorting out the resistors 244, 245. The switch springs 274, 275 are closed, thus interconnecting the conductors 261 and 263 to connect the thermistor 260 and the resistor 262 to the input terminal 232. The switch springs 277, 278 are closed and interconnect the conductors 185 and 190.

The control relay 270 is further connected by the conductor 279 in a circuit that includes a thermal protective device 280 and a magnetic switch 285. More specifically, the device 280 is in the form of a bimetallic member having one terminal 281 thereof connected to the conductor 279 and having a cooperating switch spring 282. The switch spring 282 is connected by a conductor 283 to one terminal of the magnetic switch 285 and the other terminal of the magnetic switch 285 is connected to the conductor 243. The device 280 is physically associated with one of the cooling fins 218 on the crossed-field discharge device 210, the bimetallic member of the device 280 being in contact with the switch spring 282 so long as the operating temperature of the device 210 is in a safe range, and the bimetallic member 280 moving away from the contact 282 when the temperature of the device 210, and specifically the cooling fin 218 thereof, rises above a predetermined value. The magnetic switch 285 further is physically positioned so that a portion of the magnetic flux from the field coils 220a and 220b passes therethrough; the switch 285 is of the type which is normally open and is closed when the magnetic field associated therewith reaches a predetermined strength, after which the switch 285 closes, thereby to connect the conductors 243 and 283 therethrough.

The circuit network further includes a connection from the main conductor L2 to a thermal protective device in the form of a fuse 135, one terminal of the fuse 135 being connected to the conductor L2 and the other terminal of the fuse 135 being connected by a conductor 136 to one terminal of a resistor 137, the other terminal of the resistor 137 being connected to the conductor 128.

Considering the general mode of operation of the voltage doubler and rectifier circuit 230 in conjunction with the power selector switch 110, it is noted that when the power selector switch 110 occupies its "HI" position, the line conductor L1 is connected via the closed switch springs 106, 107, the conductor 108 and the closed switch springs 117, 118 to the conductor 127, and the line conductor L2 is connected via the switch springs 119, 120 to the conductor 128. On the other hand, when the power selector switch 110 occupies its "LO" position, the line conductor L2 is connected via the fuse 135 and the resistor 137 to the conductor 128. The conductor 127 upon actuation of the timer 130 is connected via the closed switch springs 182, 183 to the conductor 186 that is connected via the fuse 246, the fuse 238 and the surge resistor 237 to the input terminal 231 of the voltage doubler and rectifier circuit 230. At this time the other input terminal 232 is connected via the conductor 263, the closed switch springs 274, 275, the conductor 261, the thermistor 260 and the resistor 261 to the neutral conductor N that is ground. Thus, when the power selector 110 occupies either its "HI" position or its "LO" position, 118 volts A.C. may be impressed between the input terminals 231 and 232 of the voltage doubler and rectifier circuit 230.

When the 118 volts A.C. voltage is applied across the input terminals 231 and 232, the various circuit components are in the "start condition" and/or the "start position" thereof. More particularly, the thermistor 260 is cold, whereby to present a very high resistance, so that the resistance between the conductor 261 and ground is essentially the resistance of the resistor 262; the conductor 261 is connected in series with the input terminal 232 via the closed switch springs 274, 275 and the conductor 263. The switch springs 271, 272 are closed, whereby the resistors 244, 245 are shorted out, thereby to apply the full 118 volt A.C. potential across the primary winding 251 of the heater transformer 250. As a result, the maximum potential for the cathode heater 214 is applied thereto, whereby to begin heating of the cathode 214, and specifically, the electron emissive coating thereon. Due to the relatively high impedance imparted to the circuit by the resistor 262, a reduced output potential is provided between the output terminals 233 and 234 of the circuit 230, thereby to apply a reduced B+ potential across the device 213 thereof; as a consequence, there will not be sufficient anode to cathode potential in the device 210 to destroy the cathode 213 by removing therefrom the emissive material prior to the heating thereof to the proper operating temperature.

As the cathode 213 heats, the device 210 becomes conductive and a current flows therethrough and through the circuit 230; since the thermistor 260 is in series with at least a portion of the current flowing through the circuit 230 and the current flowing through the device 210, the thermistor heats and the resistance thereof decreases; as the resistance of the thermistor 260 decreases, the total resistance between the conductor 261 and ground decreases, and finally the resistance of the thermistor 260 is less than 1 ohm, whereby effectively to remove the impedance between the conductor 261 and ground potential from the circuit 230. As a result, the proportion of the potential within the rectifier circuit 230 appearing at the output terminals 233, 234 rises since substantially no part thereof appears across the resistance between the conductor 261 and ground potential. From the above it will be seen that the impedance between the conductor 261 and ground potential and therefore the impedance in the input to the rectifier circuit 230 continually decreases and in a manner proportional to the total conduction of energy through the device 210, the thermistor 260 and the resistor 262 being in series with at least a portion of the energy conducted through the device 210.

When the conduction of current through the device 210 rises to a predetermined value, the magnetic field about the field coils 220a and 220b rises to the predetermined strength that causes actuation of the magnetic switch 285. Closure of the magnetic switch 285 completes a circuit for the control relay 270 as follows: from the neutral conductor N through the winding of the relay 270, and via the conductor 279, the bimetallic member 280, the switch spring 282, the conductor 283, the magnetic switch 285, thec onductor 243 and the fuse 246 to the conductor 186 on which appears the 118 volt A.C. potential. Closure of the magnetic switch 285 accordingly energizes the control relay 270; actuation of the control relay 270 opens the switch springs 271, 272, thus to remove the short around the resistors 244, 245 in series with the primary winding 251 of the heater transformer 250; opens the switch springs 274, 275 and closes the switch springs 273, 274, thus to connect the potential on the conductor 128 to the input terminal 232 of the voltage doubler and rectifier circuit 230; and opens the switch springs 277, 278 and closes the switch springs 276, 278 to connect the conductor 186 to the conductor 190, thus to commence operation of the timer motor 140.

If the power selector switch 110 is in the "HI" position, a 236 volt A.C. potential is applied between the input terminals 231 and 232; more specifically, the main conductor L1 is connected via the closed switch springs 106, 107, the conductor 108, the closed switch springs 117, 118, the conductor 127, the closed switch springs 182, 183, the conductor 186, the fuse 246, the conductor 243, the fuse 238 and the surge resistor 237 to the input terminal 231 of the circuit 230; the main line conductor L2 is connected via the closed switch springs 119, 120, the conductor 128, the closed switch springs 273, 275, and the conductor 263 to the input terminal 232 of the circuit 230; as a consequence, the full 236 volt A.C. line potential is applied as an input to the voltage doubler and rectifier circuit 230. Also both the resistors 244 and 245 are connected in series with the primary winding 251 of the heater transformer 250, thereby materially to reduce the potential thereacross and to reduce the potential applied to the cathode heater 214 in the crossed-field device 210. Also, the switch springs 115, 116 are closed thus to apply operating potential to a conductor 103 that supplies operating potential for a blower motor 138 arranged to drive a blower cooling the device 210 and a smoke eliminator 139 forming a part of the cooking oven 200, the blower motor 138 having one terminal connected to the conductor 103 and the other terminal connected to the neutral conductor N, and the smoke eliminator 139 having one terminal 103 and the other terminal connected to the neutral conductor N.

On the other hand, if the power selector switch 110 is in the "LOW" position thereof, the input terminal 231 of the voltage doubler and rectifier circuit 230 is again connected to the main line conductor L1 while the input terminal 232 of the circuit 230 is connected to the main line conductor L2 through the dropping resistor 137; more specifically, a circuit can be traced from the line conductor L1 through the switch contacts 106, 107, the conductor 108, the closed switch springs 125, 126, the conductor 127, the closed switch springs 182, 183, the conductor 186, the fuse 246, the conductor 243, the fuse 238 and the surge resistor 237 to the input terminal 231; and a circuit can be traced from the line conductor L2 through the fuse 135, the conductor 136, the dropping resistor 137, the conductor 128, the closed switch springs 273, 275 and the conductor 263 to the other input terminal 232 of the circuit 230. The dropping resistor 137 decreases the applied potential to the voltage doubler and rectifier circuit 230, thereby to decrease the output D.C. voltage at the output terminals 233 and 234 thereof, thereby to decrease the potential applied to the crossed-field discharge device 210 and thus to lower the power output thereof. Also, the resistor 245 is shorted and thus to remove it from the input circuit for the primary winding 251 of the heater transformer 250. More specifically, the switch springs 121, 122 are closed thus to connect the conductor 104 to the conductor 129, thus to short out the resistor 245; as a consequence, a slightly increased power is provided for the heater 214 when the device 210 is operated at low power. When in low power operation, i.e., when the power selector switch is in the "LO" position, the switch springs 123, 124 are closed to apply operating potential to the conductor 103 so as to operate the blower motor 138 and the smoke eliminator 139.

There are illustrated in FIG. 3 of the drawings certain operating characteristics of the voltage doubler and rectifier circuit 230 described above. There has been plotted on the vertical axis the voltage at the output terminals 233, 234 of the voltage doubler and rectifier circuit 230 and there has been plotted in the horizontal axis the current flowing therebetween. A first set of curves 300 has been plotted, these curves 300 being high power hot load lines with an applied potential of 210 volts A.C., 240 volts A.C., and 260 volts A.C., respectively, applied to the input terminals 231, 232 of the circuit 230. For the 240 volt curve, at substantially "0" current the output potential is approximately 690 volts and decreases to a value of approximately 620 volts when three amperes of current are provided between the output terminals 233, 234. A second set of curves 301 is provided which are low power hot load line curves for applied input potentials of 210 volts A.C., 240 volts A.C., and 260 volts A.C., respectively, applied to the input terminals 231, 232 of the circuit 230. A third set of curves 302 is provided, these being cold load line curves that are derived when the start resistor 262 has a value of 20 ohms, the three curves being plotted for an applied potential of 210 volts A.C., 240 volts A.C., and 260 volts A.C., respectively, at the input terminals 231, 232 of the circuit 230. There further is plotted a fourth set of curves 304 to illustrate the operating characteristic when the crossed-field discharge device 210 is connected in series with the field coil sections 220a and 220b, the three curves being for VSWR of 3:1, 1:1, and 8:1, respectively. There also is provided a vertical dashed line 305 which indicates the current through the device 210 and between the output terminals 233, 234 that will close the magnetic switch 285 and thus energize the control relay 270.

Figure 4:
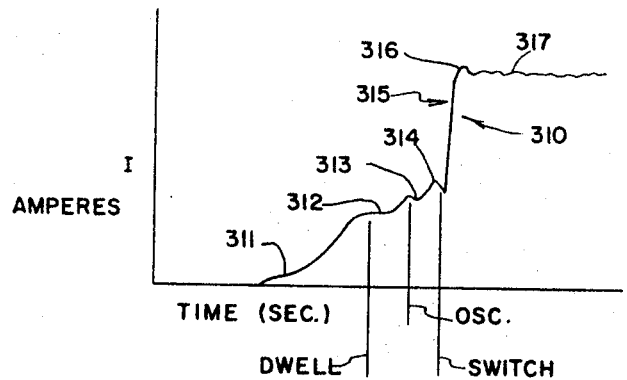
FIG. 4 is a graph plotting the current through the crossed-field discharge device as a function of time.

In FIG. 4 is plotted the relationship between the current (plotted on the vertical axis) through the crossed-field discharge device 210 and time (plotted on the horizontal axis) as measured from the application of operating potentials to the voltage doubler and rectifier circuit 230, i.e., after setting of the power selector switch 110 by the cook and the selection of the cooking time by the timer 130. It will be noted that for a short period of time there is substantially no current through the crossed-field discharge device 210, due fundamentally to the fact that the emissive material on the cathode 213 has not yet been heated by the heater 214 to a temperature to permit emission therefrom and the applied potential to the device 210 is still low. As the cathode 213 heats, emission begins and the current flow through the device 210 increases, a portion of the current flowing through the termistor 260 to cause heating thereof and a consequent decrease in a resistance thereof. As time proceeds, not only does the heater 214 further heat the cathode 213 to increase the rate of emission thereof, but the resistance of the thermistor 260 materially decreases thereby to remove resistance from the input to the voltage doubler and rectifier circuit 230 and thus to increase the potential available at the output terminals 233, 234, whereby to provide the increasing current through the device 210 as indicated by the portion of the curve designated with the numeral 311 of FIG. 4. Eventually, the cathode 213 is heated sufficiently so that the emissive material thereon is emitting at the maximum rate, whereby there is "saturation" of electron emission, thus producing the dwell area 312 on the curve 310. Shortly thereafter the crossed-field discharge device 210 begins to oscillate at the RF frequency thereof, whereby to provide an increase in current as at 313. When the total current through the tube, i.e., the sum of the D.C. component and the RF component rises to the value indicated by the numeral 314, that current through the field coil sections 220a and 220b creates a magnetic flux of sufficient strength to close the magnetic switch 285, thereby to energize the control relay 270. All of the switch springs controlled by the relay 270 are now changed from the start positions thereof to the run positions thereof, thereby to substitute a high A.C. potential on the input terminal 232 for the essentially ground potential that had been thereon heretofore; as a consequence of the application of the high A.C. potential of 236 volts to the input terminals 231 and 232, the current through device 210 sharply rises as at 315, the current rise being carried upwardly by the reactance of the field coil sections 220a and 220b as at 316 as a result of the so-called "magnet lag"; finally, there is a steady state operation of the device 210 indicated by the current on the portion 317 of the curve 310.

Now considering he overall operation of the circuit network, it may be assumed that a cooking operation is to be carried out in the oven cavity 202 during any suitable time interval, such for example as 15 minutes, and that high power is required in the cooking operation. The cook places the food in the oven cavity 202 and latches closed the door 203, whereby the door latch mechanism 102 operates the door latch switch 105 to close the switch springs 106, 107. The cook may then rotate the dial 132 of the timer 130 out of its "OFF" position and into its "15" minute position, in the clockwise direction, as viewed in FIG. 1, whereby the timer 130 is conditioned for operation in the manner previously described. Now the cook may rotate the dial 112 of the power selector switch 110 into its "HI" position; whereby the line conductor L1 is connected via the closed switch springs 106, 107 and the conductor 108 and the closed switch springs 117, 118 to the conductor 127, and via the closed switch springs 182, 183 to the conductor 186; the potential on the conductor 186 is connected via the fuse 246, the conductor 243, the fuse 238 and the surge resistor 237 to the input terminal 231 of the voltage doubler and rectifier circuit 230. Also, the input terminals 232 of the voltage doubler and rectifier circuit 230 is connected via the conductor 263 and the closed switch springs 274, 275 and the conductor 261 and the thermistor 260 and the resistor 262 and the neutral conductor N to ground potential. Also, a connection is made from the potential on the conductor 243 derived from the main line conductor L1 via the closed switch springs 271, 272 and the conductor 129 to the primary winding 251 of the heater transformer 250, the other terminal of the primary winding 251 being grounded. As a result, the cathode 213 of the device 210 is heated via an obvious circuit, the heater 214 effecting the heating of the cathode 213, whereby the same is rendered electron emissive.

As the cathode 213 is heated, the emission thereof increases and the device 210 begins to conduct current as indicated by the portion 311 of the curve 310 in FIG. 4. The thermistor 260 is cold at this time and has a relatively high impedance, whereby a relatively high impedance is inserted in the input of the voltage doubler and rectifier circuit 230, thereby to decrease the output potential between the output terminals 233 and 234 thereof. As the device 210 conducts, a portion of the energy therethrough passes through the thermistor 260, thereby to heat the thermistor 260 and to decrease the impedance thereof, the thermistor 260 ultimately having an impedance on the order of less than 1 ohm, whereby substantially to remove completely from the input of the circuit 230 the impedance between the conductor 261 and ground potential; as a result the maximum output potential is now derived at the output terminals 233, 234 of the circuit 230 and is applied across the device 210, thus progressively also to increase the current therethrough. Ultimately the cathode 213 reaches saturation, i.e., an increase of cathode temperature does not increase the electron emission thereof, whereby to provide the dwell in the current rise indicated at 312 in FIG. 4.

Shortly thereafter the device 210 begins to oscillate, and accordingly, the current therethrough further increases above the saturation value as at point 312 and eventually the rate of current flow produces a strength of magnetic field about the magnetic switch 285 to cause the same to close, this occurring at point 314 in FIG. 4.

Closure of the magnetic switch 285 operates the control relay 270 and changes the switch springs from the start positions thereof illustrated in FIG. 2 to the run positions thereof. More specifically, the switch springs 274, 275 are opened, thereby to remove from the input of the circuit 230 the thermistor 260 and the resistor 262; the switch springs 273, 275 are closed thus to apply the high A.C. potential on the conductor 128 to the input terminal 232 of the voltage doubler and rectifier circuit 230, the potential between the input terminals 231 and 232 being 236 volts A.C.; the switch springs 271, 272 are opened, thereby to place the resistors 44 and 245 in series with the primary winding 251 of the heater transformer 250, thus materially to reduce the output therefrom and the energy supplied to the cathode heater 214.

With full output potential now applied from the voltage doubler and rectifier circuit 230, the current through the device 210 immediately rises as indicated at 315 in FIG. 4 and eventually reaches the steady state condition indicated at 317. In this connection it is also pointed out that the surge resistor 237 protects the switch springs on the relay 270 when the operating potentials are first applied to the network.

Accordingly, at the beginning of the start cycle of the device 210, maximum impedance in the form of the thermistor 260 and the resistor 262 is present in the input circuit for the voltage doubler and rectifier circuit 230, thereby to provide a minimum starting potential at the output termnals 233 and 234 thereof, only 118 volts A.C. being applied as an input thereto; also, maximum heating power is supplied to the heater 214 from the transformer 250. A portion of the energy through the device 210 also passes through the thermistor 260 so that the thermistor 260 is heated proportional to the total energy conducted through the device 210. As the conduction of energy through the device 210 proceeds, the thermistor 260 is heated and the impedance thereof decreases so as to decrease the impedance in the input to the voltage doubler and rectifier circuit 230 and thus to raise the output potential at the output terminals 233, 234 thereof. Ultimately, and after the condition of a predetermined amount of energy through the device 210, the impedance of the thermistor 260 falls to elss than 1 ohm, whereby substantially to remove the impedance from the input to the voltage doubler and rectifier circuit 230 and thus to provide the full D.C. output potential at the output terminals 233, 234. After the device 210 begins to oscillate, a suffiicent magnetic field is provided by the field coil sections 220a and 220b to close the magnetic switch 285, after which the impedance represented by the thermistor 260 and the resistor 262 is switched out of the input to the voltage doubler and rectifier circuit 30 and the full potential from the conductors L1, L2 is applied as the input to the voltage doubler and rectifier circuit 230, provided that the power selector switch 110 is in the "HI" position thereof. Also, an impedance in the form of the resistors 244 and 245 is switched into series circuit with the primary winding 251 of the heater transformer 250, thus materially to reduce the energy supplied to heat the cathode 213 of the device 210. It will be understood that the circuit including the thermistor 260 automatically compensates for a low line voltage applied to the input terminals 231, 232 of the voltage doubler and rectifier circuit 230 since it will require a longer period of time to heat the cathode 213 and to conduct a predetermined amount of energy through the device 210, thus to insure that the cathode 213 is in condition for high power operation before the high potential is applied thereto. In any event, a relatively low D.C potential is initially applied to the device 210 when the cathode 213 is cold, and the applied D.C. potential gradually rises to approximately half of the high power value, whereby the device 210 begins operating at a low applied potential; only after the device 210 is oscillating is the full high power B+ potential applied thereto from the output terminals 233, 234 of the voltage doubler and rectifier circuit 230, the application o fthe high B+ potential being in response to the creation of a magnetic field of predetermined strength about the field coils 220a and 220b, which predetermined strength is achieved only after the device 210 is oscillating.

Reverting to the operation of the control relay 270, the same opens the switch springs 277, 278 and closes the switch springs 276, 278. Closure of the switch springs 276, 278 connects the conductor 186 to the conductor 190, so as to energize the winding 159 of the timer motor 140 of the timer 130 and to illuminate the lamp 191 to indicate this circumstance. Thus, the timer motor 140 rotates its motor 141, without opearting the buzzer 162, so that the engaged clutch 146 brings about the restoration of the operating shaft 131 into its "0" position upon the expiration of 15 minutes following operation of the control relay 270, which operation of the control relay 270 was simultaneous with the application of high operating potential to the voltage doubler and rectifier circuit 230 and to the crossed-field discharge device 210.

When the dial 132 of the timer 130 is thus returned into its "0" position by operation of the timer motor 140, as described above, the cam 157 governs the follower 156 to actuate the clutch 146 into its declutch position, as previously described, so that subsequent operation of the timer motor 140 does not disturb the operating shaft 131 in its "0" position. Also, the cam 179 governs the follower 178 so as to withdraw the wedge 165 from between the armature 164 and the adjacent end of the leg 161, so as to cut-on the buzzer 162, with the result that the chatter of the armature 164 produces an audible noise indicating to the cook the expiration of the preset time interval.

Further, the cam 180 in the "0" position of the operating shaft 131 opens the switch springs 182, 183 and closes the switch springs 182, 184. Opening of the switch springs 182, 183 removes potential from the conductor 186, with the result that operating potential is removed from the input terminal 231 of the voltage doubler and rectifier circuit 230 and the relay 270 restores, thereby arresting positively operation of the voltage doubler and rectifier circuit 230, so that oscillation of the crossed-field discharge device 210 is arrested to terminate the supply of RF power to the oven cavity 202 and to end the cooking operation in the oven cavity 202.

Closing of the switch springs 182, 184 completes an alternative circuit for energizing the winding 159 of the timer motor 140; this alternative circuit including the elements: L1, 106, 107, 108, 117, 118, 127, 182, 184, 185, 277, 278, 190, and N; whereby operation of the buzzer 162 is continued, notwithstanding the restoration of the relay 270.

When the cook subsequently manually returns the dial 132 from its "0" position into its "OFF" position, the cam 179 governs the follower 178, so as to effect insertion of the wedge 165 between the armature 164 and the adjacent end of the leg 161, thereby to "cut off" the buzzer 162, although the winding 159 of the timer motor 140 is still energized.

In order completely to de-energize the winding 159, the cook may restore the power selector switch 110 into its "OFF" position, so as to open the switch springs 117, 118 in order to disconnect the potential from the conductor 127; whereby the winding 159 is de-energized, and the pilot lamp 191 is extinguished to indicate this circumstance.

Operation of the circuit network to supply low power to the cross-field device 210 is fundamentally the same as the operation thereof to supply high power to the device 210, and is produced as a consequence of the setting of the power selector switch 110 into its "LO" position. In this case, the operation proceeds as previously described until the control relay 270 operates; only the resistor 244 is inserted in series with the primary winding 251 of the heater transformer 250, the resistor 245 being shorted out by closure of the switch springs 121, 122 thereby to interconnect the conductors 104 and 129 and thus to short out the resistor 245; opening of the switch springs 271, 272 upon operation of the control relay 270 therefore places only the resistor 244 in series with the primary winding 251. Likewise, in the "LO" position of the power selector switch 110, the main conductor L2 is connected thorugh the fuse 135 and the dropping resistor 288 to the conductor 128 rather than being connected directly to the conductor 128 as is the case when the power selector 110 is in the "HI" position thereof, whereby the potential on the conductor L2 is dropped across the resistor 288 before being applied to the input terminal 232 of the voltage doubler and rectifier circuit 230 via the closed switch springs 273, 275 and the conductor 263. As a consequence, the voltage doubler and rectifier circuit 230 operates to produce low D.C. power, so as to cause the crossed-field discharge device 210 to supply low RF power to the oven cavity 202 for the cooking purposes.

During the operation of the circuit network, and without reference to the position of the power selector switch 110, should the cook unlatch the front door 203 to obtain access to the oven cavity 202, the latching mechanism 102 actuates the door latch switch 105 into its open position, so that the line conductor L1 is disconnected from the conductor 108 in order to arrest operation of the voltage doubler and rectifier circuit 230 and to cause the restoration of the control relay 270. Moreover, the disconection of potential from the conductor 108 effects de-energization of the winding 159 of the primary motor 140 and arrests operation of the buzzer 162 in the event that it is operating at the time when the latch mechanism 102 is thus operated to release the front door 203 from movement out of its closed position.

There is illustrated in FIG. 5 of the drawings, a second embodiment of the invention wherein the magnetic switch has the position thereof shifted and there has been added a bypass capacitor around the crossed-field discharge device. It is to be understood that FIGS. 1 and 5 placed together and respectively arranged left and right in end-to-end relation comprise a diagrammatic illustration of the second control and power supply system. Numerals in the 500 series have been applied to the parts in FIG. 5 that correspond to like parts to which are applied numerals in the 200 series in FIG. 2.

Further considering the circuit network of FIG. 5, the crossed-field discharge device 510 is that disclosed in Ser. No. 559,267 and is supplied with D.C. power from an associated voltage doubler and rectifier circuit or unit 530 that comprises a pair of input terminals 531, 532 and a pair of output terminals 533, 534, as well as a pair of capacitors C1 and C2, that are preferably of the electrolytic type, and a pair of rectifying diodes R1 and R2, that are preferably o fthe silicon-crystal type. Also, the circuit 530 comprises a pair of bleeder or stabilizing resistors 535 and 536 connected in series with each other and across the output terminals 533, 534, and a surge limiting resistor 537 and a current protective device in the form of a thermal fuse 538. One terminal of the capacitor C1 is connected by a conductor 539 to the output terminal 533; the other terminal of the capacitor C1 is connected by a conductor 540 to one terminal of the capacitor C2; and the other terminal of the capacitor C2 is connected by a conductor 541 to the output terminal 534. The input terminal 531 is connected by a conductor 542 to the positive pole of the diode or rectifier R1 and to the negative pole of the diode or rectifier R2; the negative pole of the rectifier R1 is connected to the conductor 539; and the positive pole of the rectifier R2 is connected to the conductor 541. The input terminal 531 is connected to one terminal of the surge resistor 537 and the other terminal of the surge resistor 537 is connected to one terminal of the fuse 538. The other terminal of the fuse 538 is connected to a conductor 543; a current protective device in the form of a thermal fuse 546 interconnects the conductors 186 and 543. The output terminal 533 is connected to a B+ conductor, the output terminal 534 is connected to a B− conductor. There also is provided in parallel width the rectifier R1, a capacitor C3 and in parallel with the rectifier R2 a capacitor C4, the capacitors C3 and C4 bypassing RF interference around the rectifiers R1 and R2, respectively.

The circuit network further comprises a transformer 550 provided with a primary winding 551 and a secondary winding 552, as well as a coupling magnetic core 553. One terminal of the primary winding 551 is connected to a conductor 129 that also is connected to one terminal of a resistor 545; the other terminal of the resistor 545 is connected to the conductor 104 to one terminal of a resistor 544; and the other terminal of the resistor 544 is connected to the conductor 543 to which is supplied the potential on the main conductor L1 when the circuit network is in its start position. The other terminal of the primary winding 551 is connected by the conductor N to ground potential. One terminal of the secondary winding 522 is connected to the B− potential (through a coil to be described later) by a conductor 554 and the other terminal of the secondary winding 552 is connected to a conductor 555. The B− conductor 554 is connected to the conductor 516 via a reactive impedance 556a and the conductor 555 is connected to the conductor 519 via a reactive impedance 556b. The conductor 554 is also connected to the envelope 511 of the device 510 via a capacitive impedance 557a and a conductor 558, and the conductor 555 is likewise connected to the envelope 511 of the device 510 via a capacitive impedance 557b and a conductor 559. By this connection, the B− potential is applied to the cathode 513 of the device 510 while impedances 556a, 556b, 557a and 557b prevent the introduction of RF energy into the transformer 550.

Further, the circuit network comprises a thermistor 560, the thermistor 560 being a resistive element characterized by a high negative temperature coefficient of resistance, the thermistor 560 more specifically being of the self-heating type. One terminal of the thermistor 560 is connected to ground potential by the neutral conductor N and he other terminal is connected to a conductor 561. Disposed in parallel with the thermistor 560 is a resistor 562 having one terminal grounded by the neutral conductor N and having the other terminal connected to the conductor 561.

In the start condition of the voltage doubler and rectifier circuit 530, it is desired to connect the thermisor 560 and he resistor 562 to the input terminal 532 to which is connected a conductor 563, and to this end a marginal control relay 570 has been provided. One terminal of the control relay 270 is connected by the neutral conductor N to ground potential and the other terminal thereof is connected to a conductor 579. There is associated with the relay 570 a first pair of switch springs 571, 572 and a second set of switch springs 573, 574, 575 and a third set of switch springs 576, 577 and 578. The switch spring 571 terminates the conductor 129; the switch spring 572 terminates the conductor 543; the switch spring 573 terminates a conductor 128; the switch spring 574 terminates the conductor 561; the switch spring 575 terminates a conductor 563; and switch spring 576 terminates the conductor 186; the switch spring 577 terminates a conductor 175; and the switch spring 578 terminates a conductor 190. When the relay 570 is in the de-energized position illustrated in FIG. 2, the switch springs 571, 572 are closed, thus to interconnect the conductors 129 and 543 and as a consequence shorting out the resistors 544, 545. The switch springs 574, 575 are closed, thus interconnecting the conductors 561 nad 563 to connect the thermistor 560 and the resistor 562 to the input terminal 532. The switch springs 577, 578 are closed and interconnect the conductors 185 and 190.

The control relay 570 is further connected by the conductor 579 in a circuit that includes a thermal protective device 580 and a magnetic switch 585. More specifically, the device 580 is in the form of a bimetallic member having one terminal 581 thereof connected to the conductor 579 and having a cooperating switch spring 582. The switch spring 582 is connected by a conductor 583 to one terminal of the magnetic switch 585 and the other terminal of the magnetic switch 585 is connected to the conductor 543. The device 580 is physically associated with one of the cooling fins 518 on the crossed-field discharge device 510, the bimetallic member of the device 580 being in contact with the switch spring 582 so long as the operating temperature of the device 510 is in a safe range, and the bimetallic member 580 moving away from the contact 582 when the temperature of the device 510, and specifically the cooling fin 518 thereof, rises above a predetermined value. The magnetic switch 585 further has associated therewith a coil 585a having one terminal thereof connected to the conductor 534 and having the other terminal thereof connected to the conductor 554; the switch 585 is of the type which is normally open and is closed when the magnetic field associated therewith reaches a predetermined strength, after which the switch 585 closes, thereby to connect the conductors 543 and 583 therethrough.

The circuit network further includes a connection from the main conductor L2 to a thermal protective device in the form of a fuse 135, one terminal of the fuse 135 being connected to the conductor L2 and the other terminal of the fuse 135 being connected by a conductor 136 to one terminal of a resistor 137, the other terminal of the resistor 137 being connected to the conductor 128.

Finally, there is provided about the crossed-field discharge device 510 a bypass capacitor 590 having one terminal thereof connected to the conductor 524 and having the other terminal thereof connected to the terminal 534, whereby one terminal of the capacitor 590 is connected via the conductor 524, to the anode 512 of the device 510 and the other terminal of the capacitor 590 is connected by the terminal 534, the coil 585a, the conductor 554 and the conductor 516 to the cathode 513 of the device 510.

The general mode of operation of the voltage doubler and rectifier circuit 530 in conjunction with the power selector switch 110 is like that of the operation of the voltage doubler and rectifier circuit 230 in conjunction with the power selector switch 110. Accordingly, in interest of brevity, the points of similarity of operation between the circuits of FIGS. 2 and 5 will not be set forth in detail, but only the differences explained.

It is important during the switching from a relatively low applied potential corresponding to point 314 on the curve 310 to the relatively high applied potential corresponding to point 316 on the curve 310 that the device 510 continue to oscillate in the pi mode even under load and despite the sudden and drastic change in the operating parameters thereof. To this end the bypass capacitor 590 has been connected between the anode 512 and the cathode 513 of the crossed-field discharge device 510. There is illustrated in FIGS. 6 and 7 the reason for and the desirability of having the bypass capacitor 590. There is plotted in FIG. 6 the relationship between the voltage across the device 510 (plotted on the vertical axis) and the current therethrough (plotted on the horizontal axis) during the start thereof with the capacitor 590 removed from the circuit, the members of the sets of curves 300 through 304 for 236 volt operation (from FIG. 3) having been indicated by the dashed lines and the voltage-current curve 320 having been indicated by solid lines. Referring to FIG. 6, as the current through the device 510 builds up, the voltage drops along the line 321 (this portion of the curve following the cold load line 302) until the series line 304 (1:1 VSWR) is reached, at which time the voltage begins to rise as at 322, this corresponding to the dwell point 312 in the curve of FIG. 4. Oscillation of the device 510 begins at the point designated 322 and the current builds up to a point designated 323 at which time the control relay 570 switches its switch springs from the start positions thereof to the run positions thereof. At this time a high potential is rapidly applied to the crossed-field discharge device 510, but there is a "magnetic lag" that is due to a delay in the build up of the magnetic field about the coil sections 520a and 520b which in turn is due to a counter magnetic field within the device 510; more specifically, the conductive envelope 511 of the device 510 acts as a signle turn transformer and as such produces a counter magnetic field that delays the build up of the magnetic field about the field coils, the single twin transformer action being particularly strong during the sudden change in potential during the switching operation; there results a current excursion as at 324 to 325, the current excursion being away from the 1:1 VSWR line and toward the 8:1 VSWR line, but eventually returning to the point 327, provided that the device 510 continues to oscillate. It will be appreciated that if the current excursion along the curve 325 is sufficiently large, the device 510 may well cease to oscillate, thus to interrupt the start operation for the system. The maximum starting VSWR is determined in part by the stability characteristics of the device 510 and in part by the characteristics of the field coils 520a and 520b; the above described delay in the build up of the magnetic field associated with the field coil sections 520a and 520b is undesirable in that the transient-current magnetic field point on the performance chart for the device 510 may fall in a region favorable to oscillation at a mode other than the desired pi mode; accordingly, such conditions limit the maximum loading of the device 510 at the pi mode during the starting thereof.

There is plotted in FIG. 7 of the drawings a curve 330 similar to the curve 320 of FIG. 6 but plotting the voltage-current relationship with respect to the device 510 when the capacitor 590 is connected between the anode and cathode thereof as illustrated in FIG. 2. More specifically, as the current builds up, the voltage drops along the line 331 (this portion of the curve following the cold load line 302) until the series line 304 (1:1 VSWR) is reached at which time the voltage begins to rise as at 332, this corresponding to the dwell point 312 in the curve of FIG. 4. Oscillation of the device 510 begins at 332 and the current builds up to a point designated 333 at which time the control relay 570 switches its switch springs from the start positions thereof to the run positions thereof. At this time a high potential is rapidly applied to the crossed-field discharge device 510, the application of the high potential being in the nature of a transient which is bypassed therearound by the capacitor 590, and as a result, the current excursion as at 334 to 335 is much reduced as compared to the current excursion 325 in FIG. 5. The capacitor 590 in bypassing the device 510 during the application of the rapid change in operating potential thereto also passes a greater current through the field coil sections 520a and 520b, thus to help build the field therearound and to facilitate continued oscillation under the new operating parameters; from FIG. 7 it will be seen that the current excursion at 335 is substantially reduced so that the characteristic curve 330 departs only a small amounts from the desired 1:1 VSWR operating line 304. Continued oscillation of the device 210 at the pi mode is thus assured even if a substantial load is applied to the device 510. In this regard it is desirable that the transient impedance of the capacitor 590 be equal to or less than that of the device 510, so that a major portion of the transient condition is bypassed around the device 510.

The overall operation of the circuit network of FIGS. 1 and 5 is substantially the same as that of the circuit network of FIGS. 1 and 2, whereby in the interest of brevity, the details thereof are not here repeated. It is pointed out, however, that with full output potential applied from the voltage doubler and rectifier circuit 530, the current through the device 510 immediately rises as indicated at 315 in FIG. 4 and eventually reaches the steady state condition indicated at 317. Due to the presence of the capacitor 590 across the device 510, the voltage transient represented by the switching from the ground potential of the input terminal 532 of the voltage doubler and rectifier circuit 530 to the high potential on the conductor L2 is bypassed therearound, whereby to produce the operating curve illustrated in FIG. 7; more specifically, the capacitor 590 bypasses the transient voltage surge around the device 510, thereby substantially to eliminate the single turn transformer action of the envelope thereof. As a result, there is a rapid build-up of the current through the field coil sections 520a and 520b, thus to facilitate continued oscillation of the device 510.

The bypass capacitor 590 also facilitates the switching from low-power operation to high-power operation of the device 510, the transient rise in potential being bypassed around the device 510 and thus quickly building the current through the coil sections 520a and 520b, thus to insure that the transient voltage-current-magnetic field relationship is such as to favor oscillation in the desired pi mode rather than some other undesired mode, these conditions determining the maximum loading via the cooking cavity 502 of the device 510 for starting at the pi mode. In this regard, the capacitor 590 should have a transient impedance equal to or less than that of the device 510 so as to have the desired transient bypass effect.

In a typical illustrative example of the ultra-high frequency control and power supply system of the present invention, the bleeder and stabilizing resistors 235 and 236 each has a resistance of 10,000 ohms; the surge limiting resistor 237 has a resistance of 1 ohm; the capacitors C1 and C2 each has a capacitance of 500 microfarads; the capacitors C3 and C4 each has a capacitance of 0.05 microfarad; the thermistor 260 has a resistance in the cold condition of approximately 400 ohms and a resistance in the hot condition of less than 1 ohm; the resistor 262 has a resistance of 20 ohms; the dropping resistor 135 has a resistance of 20 ohms; and the bypass capacitor 590 has a capacitance of 60 microfarads and is preferably of the electrolytic type.

In view of the foregoing, it is apparent that there has been provided an ultra-high frequency control and power supply system for operating a crossed-field discharge device incorporated in an electronic cooking oven, wherein the control and power supply system imparts desired starting and running conditions for the crossed-field discharge device in an improved and simplified manner.

While there has been described what is at present considered to be the preferred embodiment of the invention, it will be understood that various modifications may be made therein, and it is intended to cover in the appended claims all such modifications as fall within the true spirit and scope of the invention.

What is claimed is:

1. An ultra-high frequency control and power supply system comprising a crossed-field discharge device including a pair of input terminals and a pair of output terminals, said device being characterized by the production of an A.C. voltage of ultra-high frequency across the output terminals thereof in response to the application of a D.C. voltage across the input terminals thereof, a rectifier unit including a pair of input terminals and a pair of output terminals, said unit being characterized by the production of a relatively high D.C. voltage across the output terminals thereof in response to the application of a relatively low A.C. voltage across the input terminals thereof, first connections between the input terminals of said device and the output terminals of said unit, a block including terminals adapted to be connected to a source of power supply of relatively low voltage A.C., second connections between the terminals of said block and the input terminals of said unit, and control means having a start condition for applying a relatively low D.C. start voltage across said device and having a run condition for applying a relatively high D.C. run voltage across said device, said control means being automatically converted from its start condition into its run condition in response to the conduction of a predetermined amount of energy through said device.

2. The control and power supply system set forth in claim 1, wherein said control means essentially comprises a resistive element having a relatively high negative temperature coefficient of resistance.

3. The control and power supply system set forth in claim 2, wherein said resistive element consists essentially of a thermistor.

4. The control and power supply system set forth in claim 3, wherein said thermistor is of the self-heating type.

5. An ultra-high frequency control and power supply system comprising a crossed-field discharge device including a pair of input terminals and a pair of output terminals, said device being characterized by the production of an A.C. voltage of ultra-high frequency across the output terminals thereof in response to the application of a D.C. voltage across the input terminals thereof, a rectifier unit including a pair of input terminals and a pair of output terminals, said unit being characterized by the production of a relatively high D.C. voltage across the output terminals thereof in response to the application of a relatively low A.C. voltage across the input terminals thereof, first connections between the input terminals of said device and the output terminals of said unit, a block including terminals adapted to be connected to a source of power supply of relatively low voltage A.C., second connections between the terminals of said block and the input terminals of said unit, and control means arranged in said second connections and having a start condition for governing said unit to produce a relatively low D.C. start voltage across the output terminals thereof and having a run condition for governing said unit to produce a relatively high D.C. run voltage across the output terminals thereof, said control means being automatically converted from its start condition into its run condition in response to the conduction of a predetermined amount of energy through said device.

6. The control and power supply system set forth in claim 5, wherein said control means essentially comprises an impedance that is substantially continuously variable between a relatively high start value and a relatively low run value, thereby to apply a continuously rising voltage across the output terminals of said unit in the conversion of said control means between its start condition and its run condition.

7. An ultra-high frequency control and power supply system comprising a crossed-field discharge device including a pair of input terminals and a pair of output terminals, said device being characterized by the production of an A.C. voltage of ultra-high frequency across the output terminals thereof in response to the application of a D.C. voltage across the input terminals thereof, a rectifier unit including a pair of input terminals and a pair of output terminals, said unit being characterized by the production of a relatively high D.C. voltage across the output terminals thereof in response to the application of a relatively low A.C. voltage across the input terminals thereof, first connections between the input terminals of said device and the output terminals of said unit, a block including terminals adapted to be connected to a source of power supply of relatively low voltage A.C., second connections between the terminals of said block and the input terminals of said unit, first control means having a start position imparting relatively high impedance to the input of said unit and a run position imparting relatively low impedance to the input of said unit, and second control means responsive to the conduction of a predetermined current through said device for selectively operating said first control means between its start position and its run position.

8. The control and power supply system set forth in claim 7, wherein said first control means includes an impedance element, said first control means in the start position thereof inserting said impedance element into said second connections and in the run position thereof removing said impedance element from said second connections.

9. The control and power supply system set forth in claim 8, wherein said impedance element essentially comprises a resistive element having a relatively high negative temperature coefficient of resistance, whereby the impedance thereof automatically decreases in response to the conduction of energy through said device.

10. The control and power supply system set forth in claim 9, wherein said resistive element consists essentially of a thermistor.

11. An ultra-high frequency control and power supply system comprising a crossed-field discharge device including an anode and a cathode and a field winding arranged to produce a magnetic field in the anode-cathode space and a pair of input terminals connecting said field winding in series relation with said anode and said cathode and a pair of output terminals operatively coupled to said anode and said cathode, said device being characterized by the production of an A.C. voltage of ultra-high frequency across the output terminals thereof in response to the application of a D.C. voltage across the input terminals thereof, a rectifier unit including a pair of input terminals and a pair of output terminals, said unit being characterized by the production of a relatively high D.C. voltage across the output terminals thereof in response to the application of a relatively low A.C. voltage across the input terminls thereof, first connections between the input terminal of said device and the output terminals of said unit, a block including terminals adapted to be connected to a source of power supply of relatively low voltage A.C., second connections between the terminals of said block and the input terminals of said unit, first control means having a start position for applying a relatively low D.C. start voltage across said device and having a run position for applying a relatively high D.C. run voltage across said device, and second control means responsive to a predetermined strength of the magnetic field about said field winding for selectively operating said first control means between its start position and its run position.

12. The control and power supply system set forth in claim 11, wherein said first control means in the start position thereof imparts relatively high impedance to the input of said unit and in the run position thereof imparts a relatively low impedance to the input of said unit.

13. The control and power supply system set forth in claim 12, wherein said first control means essentially comprises a resistive element having a relatively high negative temperature coefficient of resistance.

14. The control and power supply system set forth in claim 11, wherein said second control means essentially comprises a magnetic switch disposed in the magnetic field generated by said field winding.

15. An ultra-high frequency control and power supply system comprising a crossed-field discharge device including an anode and a cathode and a field winding arranged to produce a magnetic field in the anode-cathode space and a pair of input terminals connecting said field winding in series relation with said anode and said cathode and a pair of output terminals operatively coupled to said anode and said cathode, said device being characterized by the production of an A.C. voltage of ultra-high frequency across the output terminals thereof in response to the application of a D.C. voltage across the input terminals thereof, a rectifier unit including a pair of input terminals and a pair of output terminals, said unit being characterized by the production of a relatively high D.C. voltage across the output terminals thereof in response to the application of a relatively low A.C. voltage across the input terminals thereof, first connections between the input terminals of said device and the output terminals of said unit, a block including terminals adapted to be connected to a source of power supply of relatively low voltage A.C., second connections between the terminals of said block and the input terminals of said unit, first control means having a start position for applying a relatively low D.C. start voltage across said device and having a run position for applying a relatively high D.C. run voltage across said device, and second control means responsive to a predetermined value of current through said device for selectively operating said first control means between its start position and its run position.

16. The control and power supply system set forth in claim 15, wherein said first control means in the start position thereof imparts relatively high impedance to the input of said unit and in the run position thereof imparts a relatively low impedance to the input of said unit.

17. The control and power supply system set forth in claim 16, wherein said first control means essentially comprises a resistive element having a relatively high negative temperature coefficient of resistance.

18. The control and power system set forth in claim 15, wherein said second control means comprises a coil in series with the cathode of said device and a magnetic switch disposed in the magnetic field generated by said coil.

19. An ultra-high frequency control and power supply system comprising a crossed-field discharge device including a pair of input terminals and a pair of output terminals, said device being characterized by the production of an A.C. voltage of ultra-high frequency across the output terminals thereof in response to the application of a D.C. voltage across the input terminals thereof, a rectifier unit including a pair of input terminals and a pair of output terminals, said unit being characterized by the production of a relatively high D.C. voltage across the output terminals thereof in response to the application of a relatively low A.C. voltage across the input terminals thereof, first connections between the input terminals of said device and the output terminals of said unit, a block including terminals adapted to be connected to a source of power supply of relatively low voltage A.C., second connections between the terminals of said block and the input terminals of said unit, first control means having a start condition for applying a relatively low D.C. start voltage across said device and having a run condition for applying a relatively high D.C. run voltage across said device, said first control means being automatically converted from its start condition into its run condition in response to the conduction of a predetermined amount of energy through said device, second control means having a start position imparting relatively high impedance to the input of said unit and a run position imparting relatively low impedance to the input of said unit, and third control means responsive to the conduction of a predetermined current through said device for selectively operating said second control means between its start position and its run position.

20. An ultra-high frequency control and power supply system comprising a crossed-field discharge device including a pair of input terminals and a pair of output terminals, said device being characterized by the production of an A.C. voltage of ultra-high frequency across the output terminals thereof in response to the application of a D.C. voltage across the input terminals thereof, a rectifier unit including a pair of input terminals and a pair of output terminals, said unit being characterized by the production of a relatively high D.C. voltage across the output terminals thereof in response to the application of a relatively low A.C. voltage across the input terminals thereof, first connections between the input terminals of said device and the output terminals of said unit, a block including terminals adapted to be connected to a source of power supply of relatively low voltage A.C., second connections between the terminals of said block and the input terminals of said unit, first control means having a start condition for applying a relatively low D.C. start voltage across said device and having a run condition for applying a relatively high D.C. run voltage across said device, second control means having a start position placing said first control means in the input of said unit and a run position removing said first control means from the input of said unit, said first control means being automatically converted from its start condition into its run condition in response to the conduction of a predetermined amount of energy through said device, and third control means responsive to the conduction of a predetermined current through said device for selectively operating said second control means between its start position and its run position.

21. An ultra-high frequency control and power supply system comprising a crossed-field discharge device including a pair of input terminals and a pair of output terminals, said device being characterized by the production of an A.C. voltage of ultra-high frequency across the output terminals thereof in response to the application of a D.C. voltage across the input terminals thereof, a rectifier unit including a pair of input terminals and a pair of output terminals, said unit being characterized by the production of a relatively high D.C. voltage across the output terminals thereof in response to the application of a relatively low A.C. voltage across the input terminals thereof, first connections between the input terminals of said device and the output terminals of said unit, a block including a first pair of terminals adapted to be connected to a source of power supply of relatively low voltage A.C. and a second pair of terminals adapted to be connected to a source of power supply of relatively high voltage A.C., first control means having a start condition imparting relatively high impedance to the input of said unit and a run condition imparting relatively low impedance to the input of said unit, second control means having a start position connecting said first control apparatus between said first pair of terminals of said block and the input terminals of said unit and having a run position removing said first control means and connecting said second pair of terminals of said block to the input terminals of said unit, said first control means being automatically converted from its start condition into its run condition in response to the conduction of a predetermined amount of energy through said device, and third control means responsive to the conduction of a predetermined current through said device for selectively operating said second control means between its start position and its run position.

22. The control and power supply system set forth in claim 21, and further comprising a cathode heater for said device, third connections between the first terminals of said block and said cathode heater, a first resistive element having a relatively high resistance, a second resistive element having a relatively low resistance, a third resistive element, and a manually operable power selector having off and high and low positions, said power selector in its off position positively preventing operation of both said unit and said device, said power selector on its high position selecting said first resistive element for the insertion in said third connections, said power selector in its low position selecting said second resistive element for insertion in said third connections and selecting said third resistive element for insertion between the second terminals of said block and the input terminals of said unit, said third control means when said second control means is in the start position thereof removing both said first and second resistive elements from said third connections, said third control means when said second control means is in the run position thereof and said power selector is in the high position thereof inserting said first resistive element in said third connections, said third control means when said second control means is in the run position thereof and said power selector is in the low position thereof inserting said second resistive element in said third connections and inserting said third resistive elements in circuit between the second terminals of said block and the input terminals of said unit.

23. An ultra-high frequency control and power supply system comprising a crossed-field discharge device including a pair of input terminals and a pair of output terminals, said device being characterized by the production of an A.C. voltage of ultra-high frequency across the output terminals thereof in response to the application of a D.C. voltage across the input terminals thereof, means for applying a D.C. voltage across the input terminals of said device, and a capacitive element coupled between the input terminals of said device to bypass surges of energy therearound.

24. The control and power supply system set forth in claim 23, wherein said capacitive element is a capacitor connected directly across the input terminals of said device.

25. An ultra-high frequency control and power supply system comprising a crossed-field discharge device including an anode and a cathode and a field winding arranged to produce a magnetic field in the anode-cathode space and a pair of input terminals connecting said field winding in series relation with said anode and said cathode and a pair of output terminals operatively coupled to said anode and said cathode, said device being characterized by the production of an A.C. voltage of ultra-high frequency across the output terminals thereof in response to the application of a D.C. voltage across the input terminals thereof, means for applying a D.C. voltage across the input terminals of said device, and a capacitive element coupled between the input terminals of said device to bypass surges of energy therearound and through said field winding.

26. An ultra-high frequency control and power supply system comprising a crossed-field discharge device including a pair of input terminals and a pair of output terminals, said device being characterized by the production of an A.C. voltage of ultra-high frequency across the output terminals thereof in response to the application of a D.C. voltage across the input terminals thereof, control means having a start condition for applying a relatively low D.C. start voltage across said device and having a run condition for applying a relatively high D.C. run voltage across said device, and a capacitive element coupled between the input terminal of said device to bypass surges of current therearound when said control means changes from the start condition thereof to the run condition thereof.

27. An ultra-high frequency control and power supply system comprising a cross-field discharge device including an anode and a cathode and a field winding arranged to produce a magnetic field in the anode-cathode space and a pair of input terminals connectin said field winding in series relation with said anode and said cathode and a pair of output terminals operatively coupled to said anode and said cathode, said device being characterized by the production of an A.C. voltage of ultra-high frequency across the output terminals thereof in response to the application of a D.C. voltage across the input terminals thereof, a rectifier unit including a pair of input terminals and a pair of output terminals, said unit being characterized by the production of a relatively high D.C. voltage across the output terminals thereof in response to the application of a relatively low A.C. voltage across the input terminals thereof, first connections between the input terminals of said device and the output terminals of said unit, a block including terminals adapted to be connected to a source of power supply of relatively low voltage A.C., second connections between the terminals of said block and the input termnals of said unit, control apparatus having a start position for applying a relatively low D.C. start voltage cross said device and having a run condition for applying a relatively high D.C. run voltage across said device, control means for selectively operating said control apparatus between its start position and its run position, and a capacitive element coupled between the input terminals of said device to bypass surges of current therearound and through said field winding upon the operation of said control apparatus between its start position and its run position.

28. The control and power supply system set forth in claim 27, wherein said control means is responsive to a predetermined value of the current through said device for selectively operating said control apparatus between its start position and its run position.

References Cited

UNITED STATES PATENTS 2,692,946  10/1954  Schroeder _____ 219—10.55

JOHN KOMINSKI, *Primary Examiner.*

U.S. Cl. X.R.

219—10.55; 315—39.53; 328—230